July 7, 1959 R. P. PHILLIPS 2,894,121

RADIOTELEPHONE SYSTEM FEATURING SWITCHING CIRCUIT
FOR PORTABLE RADIO TRANSMITTER AND RECEIVER

Filed Feb. 28, 1956 2 Sheets-Sheet 1

INVENTOR
RAYMOND P. PHILLIPS

BY Strauch, Nolan & Neale

ATTORNEYS

July 7, 1959 R. P. PHILLIPS 2,894,121

RADIOTELEPHONE SYSTEM FEATURING SWITCHING CIRCUIT FOR PORTABLE RADIO TRANSMITTER AND RECEIVER

Filed Feb. 28, 1956 2 Sheets-Sheet 2

INVENTOR
RAYMOND P. PHILLIPS

Strauch, Nolan & Neale
ATTORNEYS

United States Patent Office 2,894,121

Patented July 7, 1959

2,894,121

RADIOTELEPHONE SYSTEM FEATURING SWITCHING CIRCUIT FOR PORTABLE RADIO TRANSMITTER AND RECEIVER

Raymond Paul Phillips, Terrell, Tex., assignor, by direct and mesne assignments, of one and one-half percent to Warrick D. Morison, Jr., or Ollie L. Morison, Detroit, Mich., and ninety-eight and one-half percent to E. V. Mitchell and Billie S. Estes Application February 28, 1956, Serial No. 568,402

3 Claims. (Cl. 250—6)

Figure 1:
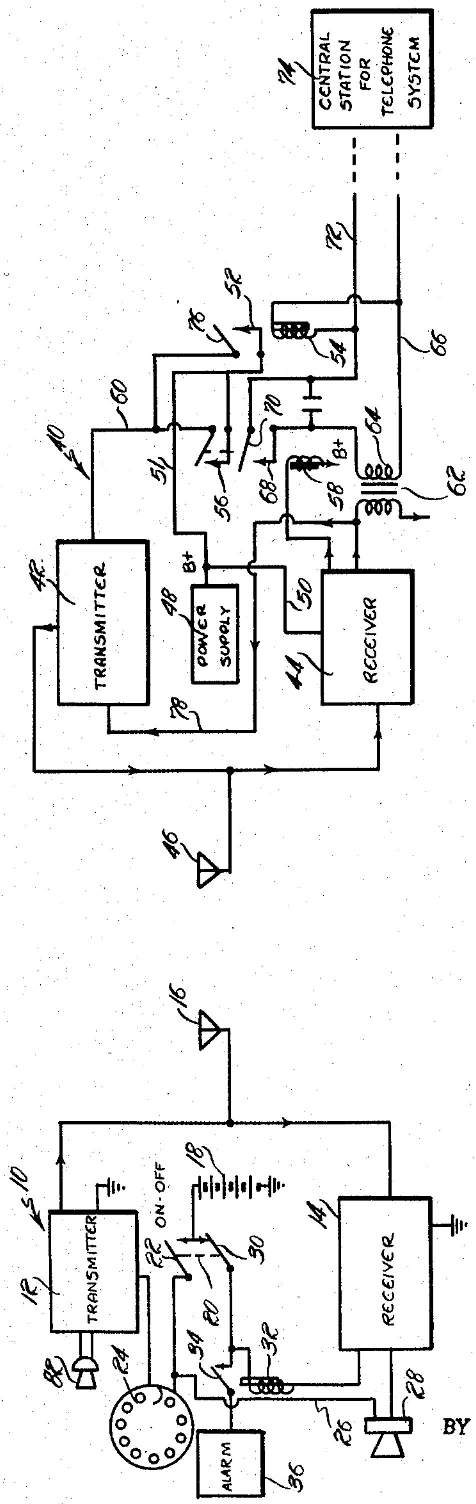

This invention relates to communication systems and more particularly to a system including a wireless or radiant energy link between a fixed station on a conventional telephone line and a portable station which enables a person at the portable station to use the telephone in a conventional manner.

One of the inconveniences of the present day telephone is that it can be used only at a fixed position where the line is installed by the telephone company. Many subscribers, particularly in places of business and even in residences, have accordingly had extensions installed at convenient positions throughout their buildings. Telephones have also been installed in automobiles to give the subscriber additional access to the telephone system. However, in all of the prior systems the mobility of the telephone is limited to point of installation of the wires from the telephone exchange.

It is a primary object of the present invention to provide apparatus which a subscriber can carry with him anywhere in the house, in his yard, or to places of recreation that will give him ordinary and conventional use of his telephone directly through the telephone installation at his own number. Thus by use of the present invention doctors or other professional men who are subject to call at all times of the day can be reached by dialing their listed number regardless of where they are, and additionally the person carrying the present invention is able to dial and talk directly through his own telephone installation without requiring any manual intervention and thus have the benefits of the telephone system at all times.

Another object of the present invention is to provide a novel system including portable and fixed transceiver stations where the transmitter in each station is de-energized except when the system is in use, and where the transmitter at the portable station is energized when the subscriber is ready to use the phone and where the transmitter at the fixed station is energized by the ordinary incoming call voltage signals on a conventional telephone line.

A further object of the present invention is to provide a means at the remote station for directly dialing on a conventional telephone line through the receiver which is connected to the telephone line at the subscriber's telephone installation.

Still another object of the invention is to provide a novel system including a portable station and a fixed station where the transmitter at the fixed station is energized by either the initiation of a call from the portable station or the reception of the ordinary call signal from the conventional telephone line.

A further and more detailed object of the present invention is to provide at the portable or remote station an alarm as well as a speaker both of which are operated by the received signal from the transmitter at the fixed station with the alarm being energized by the telephone call signal received on the conventional telephone line and the speaker energized by speech from the telephone line.

Figure 2:
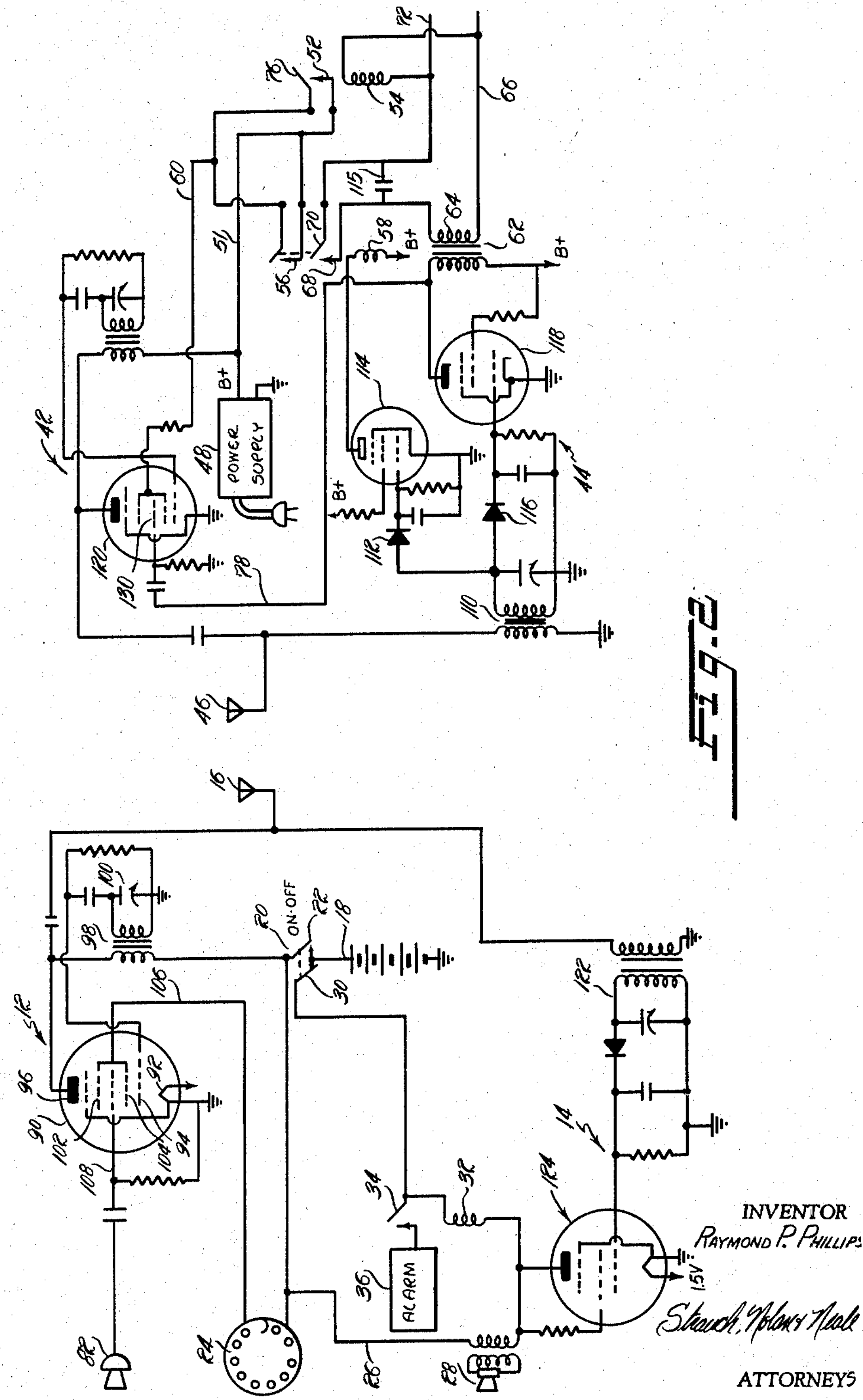

These and other objects of the invention will be more fully apparent from the claims, and from the description as it proceeds in connection with the appended drawings wherein:

Figure 1 is a block diagram of the system according to the present invention; and Figure 2 is a schematic diagram of a exemplary embodiment according to the block diagram of Figure 1.

Referring now to the drawings wherein like reference numerals have been used on similar parts throughout, in Figure 1 there is illustrated at 10 the portable remote station which includes transmitter 12 and receiver 14 which are both connected to antenna 16. It should be understood, of course, that separate antennas could be used if desired. Since this station is intended to be portable it preferably has a self contained power supply 18 which may be in the form of a battery and further includes a master on-off switch 20 having contact 22 which, when closed, supplies power through circuit interrupter 24 to transmitter 12. Circuit interrupter 24 may be any type of a switching device which is effective to intermittently interrupt the circuit or alter the output of transmitter 10 in any other fashion for the purpose of pulsing the carrier wave from transmitter 10 and in the present embodiment is preferably the ordinary dial unit of a conventional dial telephone. Power is also supplied through contact 22 of switch 20, when closed, through conductor 26 to receive 14 for energizing the receiver to supply an output signal to transducer 28 which may be the speaker in a conventional telephone set, an earphone or other suitable speaker.

Switch contact 30 of switch 20 in normal non-operating condition connects supply power 18 through the electromagnet coil 32 to receiver 14 and also connects the power supply through electromagnet switch contacts 34, when closed, to energize alarm 36.

Fixed station 40 includes transmitter 42 and receiver 44 which are connected to antenna 46, though separate antennas may be used if desired. Power supply 48 is preferably a conventional power supply energized from the commercial alternating current power mains and continuously provides energizing voltage through line 50 to receiver 44. Voltage from power supply 48 is applied to energize transmitter 42 through conductor 51 which may be connected to fixed contact 52 associated with electromagnet coil 54 and to fixed contact 56 associated with electromagnet coil 58. When the movable contact associated with either contact 52 or 56 is transferred by energization of its respective coil 54 or coil 58, power is supplied to transmitter 42 through line 60 to energize the transmitter.

A transformer 62 is connected from the output of receiver 44 and includes a secondary winding 64 which is connected on one side to line 66 of the conventional two wire telephone line and on the other side to switch contact 68 associated with electromagnet coil 58. Movable contact 70 is connected to line 72 of the two wire telephone system in such manner that when electromagnet coil 58 is energized the circuit to the central station for the telephone system indicated at 74 is complete and includes conductor 66, secondary winding 64, switch contacts 68, 70 and conductor 72.

Electromagnet coil 54, which is responsive to the usual alternating current ringing signal provided by a conventional telephone system, is connected between lines 66 and 72 so that when an ordinary ringing call signal is received from the central station, contacts 52 and 76 are closed.

Speech signals coming on the telephone line from central station 74 are applied through transformer 62 and conductor 78 as an input signal to modulate the transmitted signal from transmitter 42.

In operation, any number in the telephone system may be dialed directly from remote station 10 by first transferring on-off switch 20 to its alternate position thereby energizing the carrier of transmitter 10 which is transmitted from antenna 16 and received by antenna 46 of the fixed station 40. Receiver 44 is continuously energized and tuned to receive the carrier signal from transmitter 12 of remote station 10. Receiver 44 provides a signal responsive to the presence of the carrier from transmitter 10 as by an AVC circuit or other suitable means to energize electromagnet coil 58 thereby closing the associated switch contacts 56 and 68. The telephone circuit to the central station is then completed and transmitter 42 energized.

The operator at remote station 10 then dials the number of the subscriber being called by means of dial 24 which causes the carrier wave from transmitter 12 to be pulsed in accordance with the intermittent breaking or interrupting of the power supplied to transmitter 12 by dial 24. This causes a corresponding pulsing in the signal received by receiver 44 at the fixed station and in the energization of electromagnet coil 58 which accordingly causes movable contact 70 to intermittently open and close a specific number of times corresponding to the actual number dialed on dialing element 24 at the remote station. This accordingly provides the usual dialing signal which is used in the telephone system and is effective to connect fixed station 40 with the called subscriber through telephone lines 66, 72 to the central station.

When the dialing is completed, the carrier of transmitter 12 remains on and electromagnet 58 is accordingly energized with contacts 68 and 70 being closed throughout the remainder of the telephone conversation. Since electromagnetic coil 58 is energized, switch contacts 56 are closed and transmitter 42 is continuously energized so that when the called subcriber answers the telephone, his speech is supplied through transformer 62 and conductor 78 to the input of transmitter 42 to thereby modulate the transmitted signal which is transmitted from antenna 46 to antenna 16 and received by receiver 14. Since on-off switch 20 is in the alternate position from that shown, receiver 14 is energized through conductor 26 and the speech signal received by receiver 14 is reproduced at transducer or speaker 28. The person at remote station 10 then speaks through microphone 82 of transmitter 12 thereby modulating the signal to receiver 44 at the fixed station which in turn provides transformer 62 with an audio signal in the form customarily supplied to a conventional telephone line. When the conversation is completed, master on-off switch 20 in remote station 10 is closed to its normal illustrated position thereby de-energizing transmitter 10 whereby electromagnet coil 58 in the fixed station is de-energized and the entire telephone is removed from the circuit in accordance with conventional operation.

When an incoming call from central station 74 is received, the conventional alternating current call signal energizes electromagnet coil 54 thereby causing contacts 52 and 76 to close and thus supply energization voltage to transmitter 42. The carrier wave from transmitter 42 is transmitted from antenna 46 to antenna 16 and picked up by receiver 14 at the remote station which at this time is energized through electromagnet coil 32, closed switch contacts 30 to power supply 18. Reception of the carrier signal from transmitter 42 by receiver 14 causes energization of electromagnet coil 32 thereby closing switch contacts 34 and energizing alarm 36 with voltage from power supply 18 through closed contact 30. If alarm 36 is in the form of a buzzer or bells, it will be energized in the same intermittent manner as are the conventional bells in the telephone.

As soon as the remote station is answered, on-off switch 20 transfers to its alternate position thereby opening contact 30 and preventing further energization of alarm 36 and transferring the energization circuit to receiver 14 through closed switch contacts 22 and conductor 26 whereby the receiver output is then connected to speaker 28. Simultaneously transmitter 12 is energized through switch contact 22 and its carrier is received by receiver 44 at the fixed station thereby energizing electromagnet coil 58 and closing switch contacts 56 to thereby continuously energize transmitter 42 and close contacts 68, 70 to complete the telephone circuit. The answer at remote station 10 is spoken through microphone 82 to transmitter 12 and the modulated signal is received by receiver 44 at the fixed station and applied to the telephone line through transformer 62. Speech signals coming from central section 74 are supplied to transformer 62 and conductor 78 to modulate the carrier of transmitter 42 and received by receiver 14 at the remote station to be reproduced by speaker 28. When the conversation is completed, switch contacts 22 and 30 of on-off switch 20 are transferred to their illustrated position thus de-energizing the carrier from transmitter 12 and de-energizing electromagnet coil 58 at the fixed station thereby returning the station to its normal non-operating condition.

Referring now to Figure 2, transmitter 12 at the remote or portable station preferably includes a single stage combination oscillator and modulator such as the illustrated pentagrid converter 90 where the portable station is not intended to be used more than a few hundred feet from the fixed station since this reduces power supply requirements and permits a small, light and compact container for the portable station. I have found that a 1R5 type tube is satisfactory for this purpose with the oscillatory circuit being provided between filament 92, first grid 94 and anode 96 and feedback provided by transformer 98 having trimer capacitor 100 in an otherwise conventional oscillator circuit. Grids 102 and 104 are connected together and to conductor 106 and through telephone dial 24 and switch contact 22 to power supply 18. Thus voltage is continuously supplied to the oscillator circuit components and the on-off switching of the carrier, which is very critical for satisfactory dialing, is effected by control of the electron conduction through tube 90 by grids 102 and 104. Amplitude modulation of the oscillator signal is effected by the grid connected to conductor 108 which is supplied with the audio signal from microphone 82. Additional stages of amplification of the audio signal may be used where desired and if necessary for matching the impedance of microphone 82 to the input of tube 90.

In receiver 44 at the fixed station, circuit 110 is tuned to the frequency supplied by transmitter 90 and produces effectively two signals, one responsive to the presence of the carrier wave for energizing electromagnet coil 58 and the other to provide an audio signal to transformer 62. Electromagnet coil 58 may, for example, be an extremely sensitive relay which requires only a small amount of current such as that shown in Patent No. 2,206,682 to Wassell and operated directly from an AVC voltage in a conventional receiver or may be energized through a separate signal channel as illustrated in Figure 2 including detector diode 112 and amplifying tube 114, which supplies current to electromagnet coil 58. The circuit parameters associated with amplifier tube 114 should be chosen so that the pulsing of the carrier signal by dial 24 provides a pulsing output current in tube 114 for properly controlling operation of switch contacts 68 and 70 in the telephone line to produce correct dialing. I have found the addition of an electrolytic capacitor 115 having a capacity of approximately .001 mfd. across switch contacts 68 and 70 increases reliability of the dialing operation.

The audio signal to be supplied to transformer 62 may be provided in a separate signal channel including detector 116 and amplifier 118 thereby providing a signal to the primary of transformer 62 which is similar to the usual signal supplied to the telephone line.

The transmitter 42 at the fixed station may, for example, be a pentagrid converter and be substantially identical to transmitter stage 12 at the remote portable station. Transmitter 42, however, is preferably tuned to slightly different frequency so that there will be no direct interference with the transmitted signal from transmitter 12 and filters or other suitable means may be provided for preventing the signal from transmitter 42 from being received by receiver 44.

Receiver 14 at the portable station may be any conventional type of receiver and preferably includes tuned circuit 122 which is tuned to receive the transmitted signal from transmitter 42 at the fixed station. Filters or other signal rejection means may be provided to prevent the signal emitted by transmitter 12 from being directly picked up in receiver 14. According to one feature of my invention, the receiver at the remote station consists of only a single signal channel with the output of amplifier tube 124 supplied to electromagnet coil 32 for closing switch contacts 34 and energization of alarm 36 when on-off switch 20 is in the position illustrated. The output from amplifier tube 124 alternatively is supplied to speaker 28 through a path including conductor 26 and switch contact 22 of on-off switch 20 when the operator has answered or is otherwise talking over the telephone system.

Thus when a call signal is received over telephone line 66, 72 at the fixed station and electromagnet coil 54 is energized by the call signal alternating voltage thereby closing contacts 52, 76 and energizing transmitter 42, an unmodulated carrier signal is provided which occurs at the usual bell ringing rate of a conventional telephone. Tube 124 of receiver 14 at the remote station amplifies current during the reception of the carrier signal thereby energizing electromagnet coil 32 and energizing alarm 36 corresponding to the presence of the conventional telephone call signal on line 66, 72. Upon "answering" at the remote station, on-off switch 20 is transferred thereby opening switch contact 30 and preventing additional energization of alarm 36. From then on during the telephone conversation, the carrier signal from transmitter 42 at the fixed station is modulated with the speech received on grid 130 through conductor 78.

It should be here noted that while in the present embodiment incoming speech signals are supplied through transformer 62 to lead 78 and transmitter tube 120, other coupling arrangements may be used, such as a convention hybrid circuit, which separates signals in accordance with their direction through the circuit thereby preventing any pick-up on lead 78 of the output signal from tube 118 on receiver 44 at the fixed station. However, the illustrated circuit operates satisfactorily where microphone 82 and speaker 28 are part of the conventional telephone headset. The modulated output signal from transmitter 42 at the fixed station is thus received by receiver 14 at the remote station, amplified by tube 124 and supplied to speaker 28 thereby establishing a conventional telephone circuit connection.

It should be understood that different transmitters and receivers can be used at both the remote or portable station and the fixed station without departing from the principle of the present invention. For installations where the remote transmitter is to be used at distances of several miles from the fixed station, more powerful transmitter and more sensitive receivers, such for example as used by mobile ham radio operators, will of course be necessary. It is therefore apparent that this invention may be embodied in other specific forms without departing from the spirit or essential characteristics thereof. The present embodiment is therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus adapted to be connected into a conventional dial telephone system comprising a fixed station having a wireless transmitter and first receiver and a remote station having a wireless transmitter, a second receiver including an alarm and a speaker, and a power supply; a first circuit for energizing the alarm with an output signal from said second receiver due to the carrier wave from said fixed station transmitter, a second circuit connecting power to said second receiver for energizing the speaker with the output signal from said second receiver, and switching means for alternately rendering said first or second circuit operative, said switching means being operative when said remote station is on a standby basis to energize said first circuit and when said remote station is answered to energize said second circuit, said fixed station including means responsive to a ringing signal from said telephone system for energizing the transmitter at the fixed station to send a signal to said receiver at the remote station and thereby energize the alarm through said first circuit concomitantly with the presence of said ringing signal, and means for energizing a further circuit in said fixed station when said remote station is answered, said further circuit means connecting intelligence signals from said telephone system to the transmitter at the fixed station to be transmitted to the remote station receiver and thereby energize said speaker.

2. Apparatus for use with a conventional telephone system having wires including a station remote from said telephone system composed of a conventional telephone having the usual voice transmitter, speaker, main on-off switch, ringing bells and dial, and further having a first radio transmitter for producing a carrier wave adapted to be modulated by signals from said voice transmitter, a radio receiver including detector and amplifier stages for receiving a modulated carrier wave and a power supply; a first circuit including said main on-off switch for connecting the power supply to produce the carrier wave from said radio transmitter when said remote station is in use; means connecting said dial to pulse said transmitter carrier wave on and off in accordance with a number in the telephone system to be called; a second receiver connected to the wires in the telephone system and having means responsive to the carrier from said radio transmitter for supplying dialed impulses to said telephone wire; a second transmitter connected to the wires of said telephone system, means responsive to the ringing signals on said telephone system wires for energizing said second transmitter to produce a carrier wave; a second circuit in said remote station receiver for connecting said ringing bells to be energized by said last mentioned carried wave; circuit means including said on-off switch for rendering said ringing bells inoperative when said remote station is in use; and a third circuit including said on-off switch for applying operating voltage to said receiver amplifier for energizing said telephone speaker when said remote station is in use.

3. Apparatus adapted to be connected into a conventional dial telephone system comprising: a fixed station having a transmitter for producing a first modulated carrier wave, and a receiver; and a remote station including a transmitter for producing a second modulated carrier wave, a receiver tuned to receive said first carrier wave including an alarm and a speaker, a master on-off switch, first circuit means including terminals of said on-off switch for connecting said alarm to said remote station receiver to energize said alarm concomitantly with transmission of said first carrier wave by said fixed station transmitter when said on-off switch is in its "off" position, second circuit means including terminals on said on-off switch connecting said speaker to said remote station receiver to energize said speaker with the modulated signal from said fixed station transmitter when said on-off switch is in its "on" position, said second circuit means also including a circuit connection for energizing said remote station transmitter to produce said second carrier wave, dialing means for pulsing the carrier of said remote station transmitter in accordance with the number to be called on the telephone system, and a microphone connected to said remote station transmitter for modulating said second carrier wave; said fixed station receiver including a first circuit device responsive to just the carrier of a second carrier wave for producing dialing impulses on the telephone line, a second circuit device responsive to modulation on said second carrier wave for supplying said modulation into the telephone system, and means responsive to the ringing voltage on the telephone line to energigze said fixed station transmitter to produce said first carrier wave.

References Cited in the file of this patent

UNITED STATES PATENTS

| | | |
|---|---|---|
| 1,857,819 | Merriam | May 10, 1932 |
| 2,064,958 | Taylor et al. | Dec. 22, 1936 |
| 2,129,332 | Mastini | Sept. 6, 1938 |
| 2,472,585 | Hailes | June 7, 1949 |